I. E. FAIR.
CORD FABRIC AND MEANS FOR MAKING THE SAME.
APPLICATION FILED JAN. 14, 1919.

1,405,992.

Patented Feb. 7, 1922.
3 SHEETS—SHEET 1.

Inventor
Irvin E. Fair
By Robert M. Pierson
Atty.

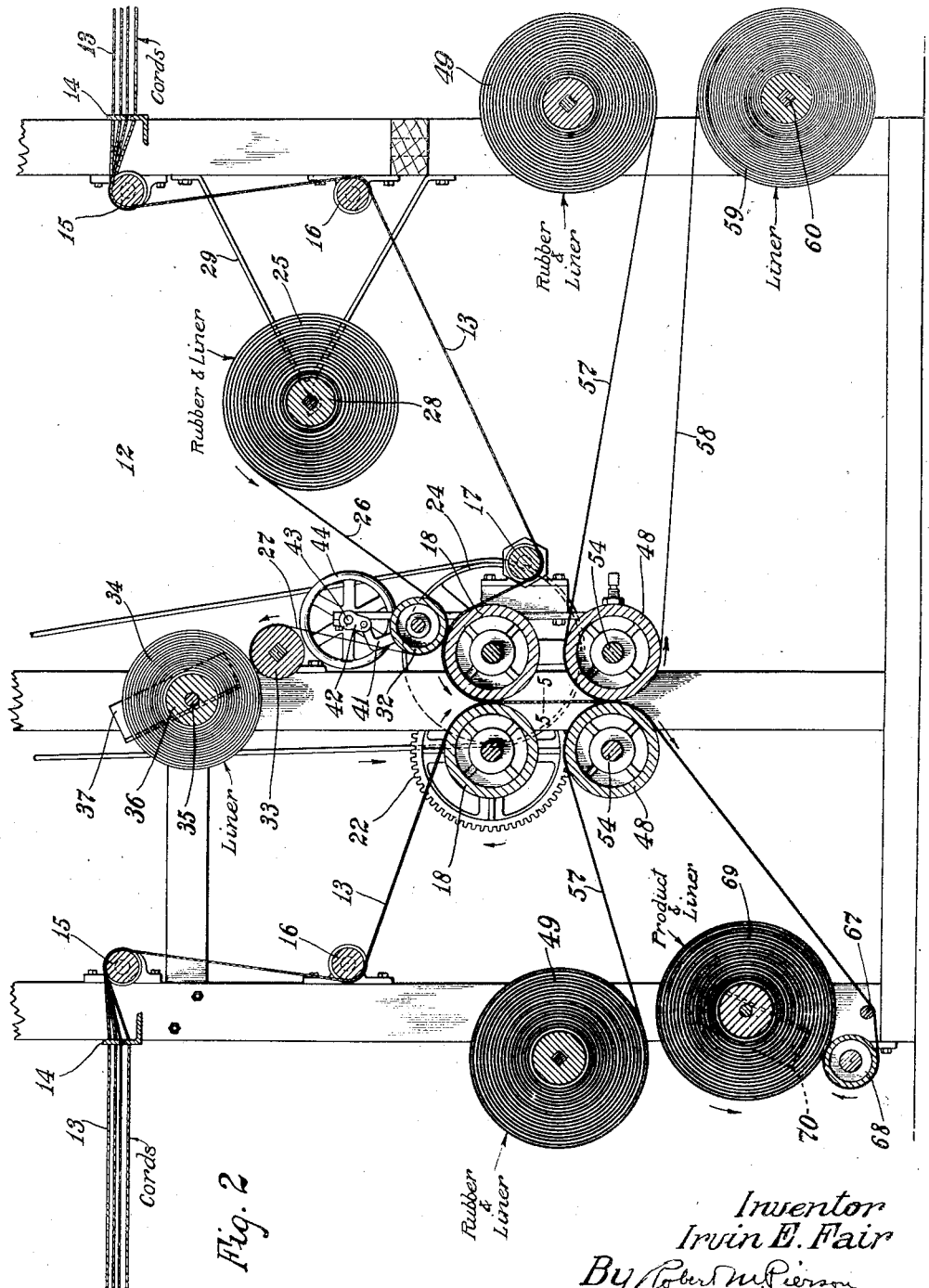

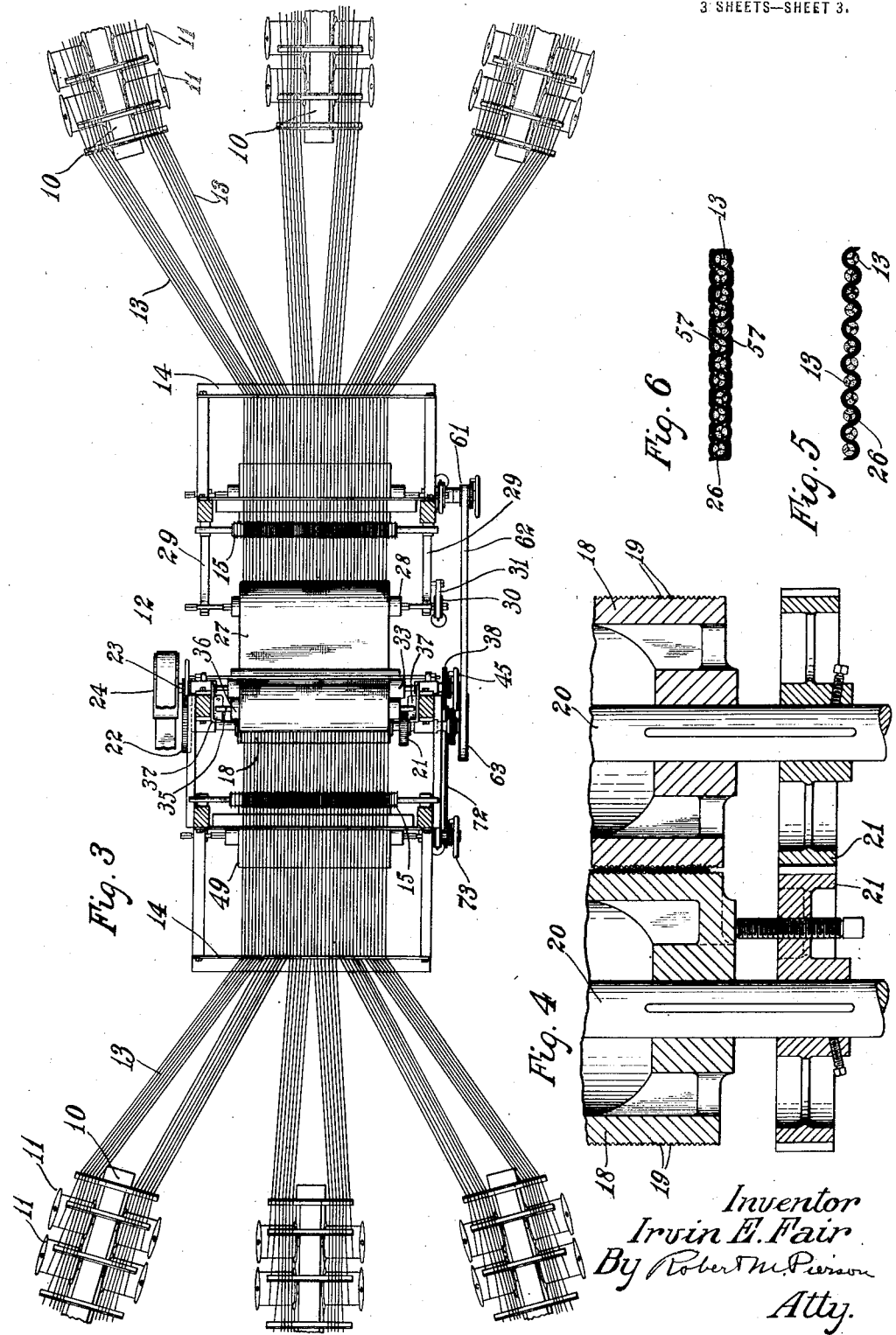

ized cord fabric and means for making the same, but it is to be understood that the following description and accompanying drawings are merely illustrative of the invention and are not to be construed as limitative thereof.

UNITED STATES PATENT OFFICE.

IRVIN E. FAIR, OF AKRON, OHIO, ASSIGNOR TO THE B. F. GOODRICH COMPANY, OF NEW YORK, N. Y., A CORPORATION OF NEW YORK.

CORD FABRIC AND MEANS FOR MAKING THE SAME.

1,405,992.   Specification of Letters Patent.   Patented Feb. 7, 1922.

Application filed January 14, 1919. Serial No. 271,069.

*To all whom it may concern:*

Be it known that I, IRVIN E. FAIR, a citizen of the United States, residing at Akron, in the county of Summit and State of Ohio, have invented a certain new and useful Cord Fabric and Means for Making the Same, of which the following is a specification.

This invention relates to the manufacture of composite rubber and cord fabrics adapted for incorporation in any suitable structure such, for example, as a pneumatic tire, and it has among its objects; first, to provide an improved vulcanizable product in which a sheet of plastic rubber is associated with the cords in a novel manner so as to isolate neighboring cords with intervening rubber and partially cover said cords on the two faces of the fabric, said product being further provided, if desired, with a facing sheet or sheets or body or bodies of plastic rubber to fully cover the cords on one or both surfaces of the fabric; secondly, to furnish an improved method of making this product, which may be carried on progressively so as to produce a large output in a given time and at a relatively low cost; and thirdly, to provide an improved apparatus for practicing said method.

Of the accompanying drawings,

Fig. 2 is a vertical section of the same.

Fig. 3 is a plan view of the machine on a smaller scale, showing some of the cord spools.

Fig. 4 is a detail section on the line 4—4 of Fig. 1.

Fig. 5 is a cross-sectional view of a strip of the product without the facing sheets of rubber, taken on the line 5—5 of Fig. 2, the thickness of rubber being somewhat exaggerated.

Fig. 6 is a similar view of the product with the facing sheets.

Figure 1:
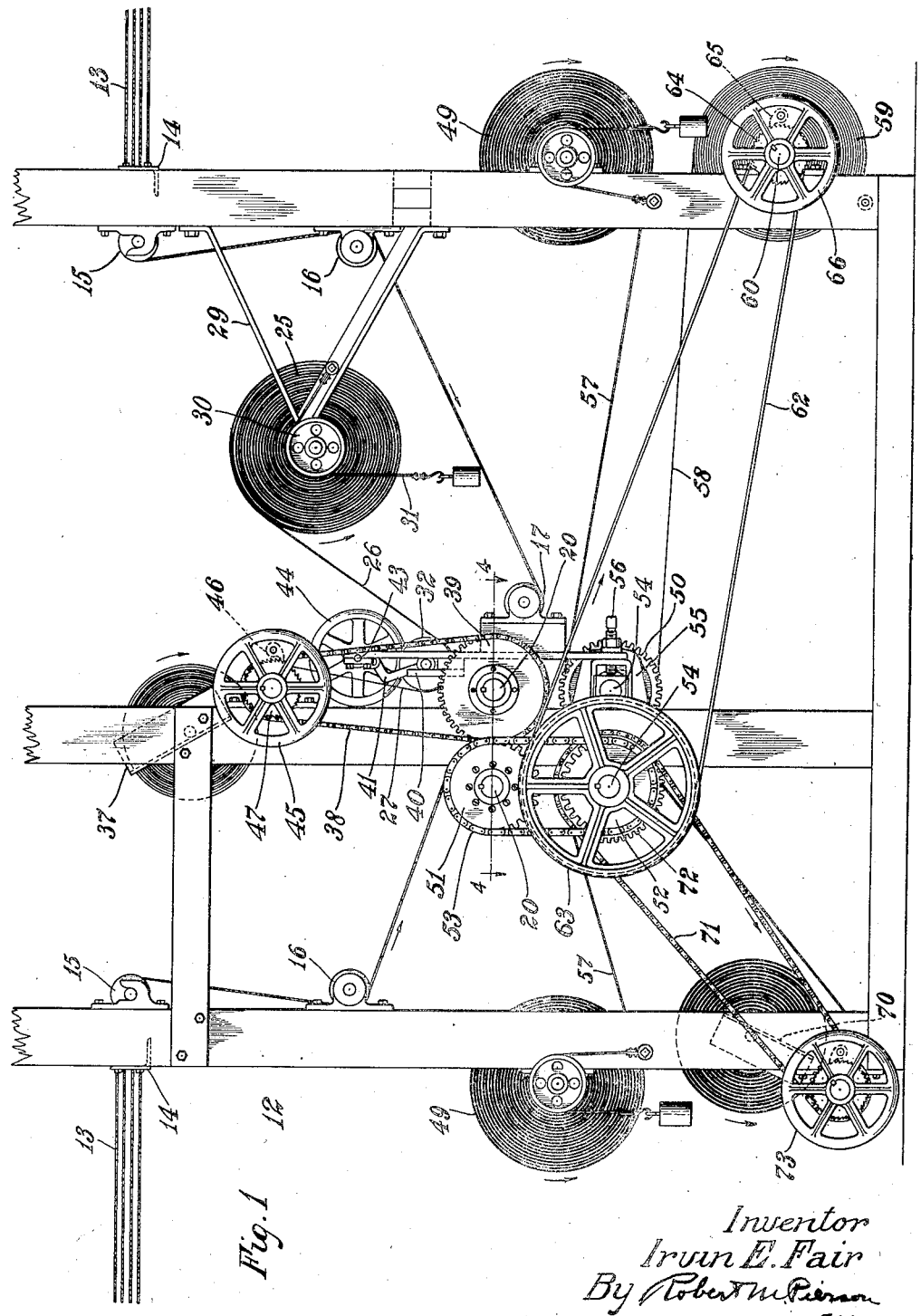
Fig. 1 is a side elevation of a machine for making cord fabric according to my invention, the cord-supplying spools being omitted in this view.

Suitable creels 10 of cord-supplying spools 11 are provided on opposite sides of the fabric-making or assembling machine 12, for feeding the cords 13 to said machine in two sets, to be there assembled with the plastic rubber sheet or sheets to make the fabric. The cords, before being wound upon the spools, have preferably been previously impregnated with rubber by passing the strands thereof through rubber cement, evaporating the solvent, and twisting the strands together. At their entrance into the assembling machine 12, the cords 13 pass through a pair of perforated guide plates 14 whereby they are uniformly spaced apart and from thence around a number of freely-journalled guide rollers 15, 16, 17, which preserve the spacing of the cords by means of parallel circumferential grooves for the individual cords formed in the peripheries of said rollers. The two sets of cords then pass toward and into the assembling plane or zone (which begins where the first rubber sheet meets the right-hand set of cords) over and down between a pair of gear-driven assembling rollers 18 which bring the two sets of cords into juxtaposition with each other and into contact with a sheet of raw rubber as will be further described. These rollers 18 are formed with parallel circumferential grooves 19 on their peripheries for receiving the individual cords as indicated in Fig. 4, and are so registered with each other that the grooves on one roller come opposite the ridges or spaces between the grooves on the other roller. The rollers 18 are preferably of equal diameter as shown and keyed to their shafts 20, to which latter are also keyed a pair of intermeshing spur gears 21 whereby the right-hand roller is driven from the shaft of the left-hand roller. On the opposite end of the shaft of the latter is a gear 22, meshing with a pinion 23 (Fig. 3) on the shaft of a pulley 24 driven by a belt from a suitable source of power.

25 is a roll of plastic sheet rubber 26 wound in spiral form, together with a suitable fabric liner 27 to keep the rubber surfaces from sticking together, on a core-drum 28 which is supported on suitable bearing brackets 29, this core-drum having on one end of its shaft a friction drum 30 engaged by a band brake 31 to furnish a retarding tension. The rubber sheet is composed of raw gum compounded with the usual vulcanizing and other ingredients, such as sulphur, accelerator, etc., and is located on the under side of the liner as the two unwind from the roll 25. The stock and liner then pass under a guiding and pressure roller 32, which works in conjunction with the right-hand grooved roller 18 to press the rubber sheet against the right-hand set of cords passing over said roller 18. The liner 27 then leaves the rubber sheet, passes upwardly and around a liner-feeding roller 33, and is rewound in a spiral roll 34 which rests by gravity on said roller 33, the trunnions formed by the projecting ends of the shaft 35 of the core-drum 36 of roll 34 being adapted to rise and fall along a pair of inclined bearing guides or tracks 37. On one end of the shaft of the liner-feeding roller 33 is mounted a sprocket connected by a chain 38 with a sprocket 39 on the right-hand one of the shafts 20 for transmitting power to drive the roller 33. The shaft of the pressure roller 32 is mounted in bearing blocks which slide vertically in a pair of guides 40, and this roller is adapted to be raised out of the way by means of a pair of links 41 connected with cranks on a shaft 43 rotated by a hand-wheel 44, when the machine is being restrung or charged for operation. For manually turning the liner feed-roller 33 ahead independently of its automatic drive, a hand-wheel 45 is keyed to the shaft of said roller and provided with a pawl 46, which engages the teeth of a ratchet wheel 47 fixed to the upper sprocket of chain 38, said ratchet and sprocket turning together loosely on the roller shaft.

Below and parallel with the grooved assembling rollers 18 are a pair of secondary smooth-surfaced cylindrical assembling rollers 48 which act as pressure rollers to flatten and consolidate the composite fabric by pressing the cords 13 of one set into the spaces between the cords of the other set, thereby bringing both sets of cords into the fabric approximately in the same plane as indicated in Figs. 5 and 6, and at the same time corrugating the sheet of plastic rubber 26 so that it takes a sinuous course from face to face of the fabric. The sinuous rubber sheet covers the alternate cords on each face and occupies the spaces between the cords, which latter become embedded from opposite sides in the grooves or channels which they form in said sheet, whereby the sinuous sheet is intercalated with the two sets of cords or strands. Fabric having this construction could then be incorporated in any appropriate structure and vulcanized, but in cord tire manufacture, as well as in other situations, it is generally desirable to have a complete facing in the form of a sheet or sheets, or body or bodies of rubber on one or both sides of the fabric, and, for this purpose, a further function of the rollers 48, as here illustrated, is to apply these facing bodies of rubber as preformed sheets on both sides. 49, 49 are two rolls of plastic sheet rubber and fabric liner mounted on opposite sides of the machine on core-drums having tension devices of the same character as that for the roll 25, which need not be described in detail. Traction is furnished by positively driving the rollers 48 which have suitable intermeshing gears on their shafts, one of which is shown at 50 in Fig. 1, the drive being transmitted by sprockets 51, 52 and a chain 53 from the left-hand shaft 20 to the shaft 54 of the left-hand roller 48. The shaft 54 of the right-hand roller 48 is mounted in bearing boxes slidable horizontally in a pair of guides 55, backed by set-screws 56, so that the right-hand roller 48 may be backed off when inserting the leading ends of the cords or of fresh rubber sheets.

57, 57 are the facing sheets of plastic rubber, and 58 is the fabric liner for the right-hand sheet, which leaves said sheet as the latter becomes incorporated in the cord fabric, and is rewound in a roll 59, the shaft 60 of whose core-drum is provided with a pulley 61 driven by a belt 62 from a pulley 63 on the left-hand shaft 54, the driven pulley being loose on shaft 60 and attached to a ratchet wheel 64 engaging a pawl 65 on a hand-wheel 66 which is keyed to the shaft 60, whereby the liner roll 59 may be manually turned ahead independently of its automatic drive.

The composite cord and rubber fabric passes over a small guide roller 67 and around a feed roller 68, and is wound up in a roll 69 resting by gravity on said feed roller and having its core-drum trunnions guided by inclined bearing tracks 70. The fabric liner (not separately shown) which unwinds from the left-hand roll 49 with the plastic rubber facing sheet remains with said facing sheet, and winds up with the rubberized cord fabric on the roll 69. The feed roller 68 is driven through a chain 71 from a sprocket 72 on the left-hand shaft 54, and is provided with a hand-wheel 73 and a ratchet-and-pawl drive of the same character as already described for the feed roller 33 and the liner roll 59.

The complete unvulcanized product is represented conventionally in cross-section in Fig. 6, with the flat facing sheets 57 of plastic rubber overlying the crests of the sinuous interlaid rubber sheet 26 and the intervening bare sides of the alternate cords, the cord and rubber components being caused firmly to adhere and being somewhat compressed as they pass between the rollers 48, so that the surfaces of the facing sheets become slightly indented between the cords and between the strands of each cord when the compression is relieved, the rubber faces of the fabric showing a corded surface when rubber sheets of moderate thickness are employed. My invention has the advantage of thoroughly isolating and coating the individual cords with rubber so that there is no rubbing contact of the cords during deformation to which the fabric may be subjected in a pneumatic tire or other structure, and at the same time it enables a large quantity of product to be expediously manufactured at a relatively low cost and with practically no waste. While I prefer to feed both sets of cords or strands simultaneously into the fabric from opposite sides and to feed a plurality of separate cords simultaneously in each set so as progressively to form a full-width web of indefinite length for the sake of maximum production, and while I prefer to operate with previously-prepared, unheated sheets of rubber stock, it will be understood that the stock may be sheeted and prepared and treated in any suitable manner prior to its incorporation in the fabric, and the herein-described general features and details of the method and apparatus may be varied in any suitable manner within the scope of the appended claims.

I claim:

1. A fabric having cords lying side by side in alternating channels in the opposite faces of a sheet of plastic rubber.

2. A fabric comprising a series of parallel cords in approximately the same plane, and a sinuous sheet of plastic rubber interlaid with said cords and separating them from each other.

3. A fabric comprising a corrugated sheet of raw rubber and a series of parallel cords alternately occupying the channels on the respective sides of said sheet.

4. A fabric comprising a series of rubber-impregnated, parallel cords isolated from each other by, and adhering to a sinuous sheet of raw rubber which is interlaid with said cords.

5. A fabric comprising a series of parallel cords in approximately the same plane, a sinuous sheet of plastic rubber interlaid with said cords, and a facing body of plastic rubber on one side of the fabric.

6. A fabric comprising a series of parallel cords in approximately the same plane, a sinuous sheet of plastic rubber interlaid with said cords, and substantially flat facing sheets of plastic rubber on both sides of the fabric.

7. The method of making rubberized cord fabric which comprises laying cord strands side by side in alternating channels in opposite faces of a sheet of plastic rubber.

8. The method of making rubberized cord fabric which comprises locating a series of parallel cord strands in spaced relation, locating a second series of cord strands in the spaces between the strands of the first series, and locating a sinuous sheet of rubber between the strands of the two series.

9. The method of making rubberized cord fabric which comprises locating a series of cord strands side by side in spaced relation, overlaying said series with a sheet of raw rubber and forcing a second series of cord strands into the spaces between the strands of the first-said series, thereby corrugating the rubber sheet and intercalating it with the two series of strands.

10. The method of making rubberized cord fabric which comprises locating a series of parallel cord strands in spaced relation, overlaying said strands with a sheet of plastic rubber, and progressively forcing a second series of cord strands against said sheet and into the spaces between the strands of the first-said series.

11. The method of making rubberized cord fabric which comprises intercalating a sheet of plastic rubber sinuously between the members of two sets of alternating cord strands, and applying a facing body of rubber to one side of the resulting web.

12. The method of making a rubberized cord fabric which consists in laying against, and from opposite sides of a flat sheet of plastic rubber a series of spaced-apart cords of which those on one side alternate with the spaces between those on the opposite side, and pressing the cords from the two sides approximately into the same plane, thereby corrugating the rubber sheet and embedding the cords in the channels thereof.

13. The method of making a rubberized cord fabric which consists in progressively feeding a series of spaced-apart cords in two sets from opposite sides of an assembling zone, with the cords of each set registered with the spaces between the cords of the other set, progressively feeding plastic rubber between the two sets of cords, and progressively associating the cords and rubber by rolling pressure applied from opposite sides to interpose the cords of the respective sets between each other in the plane of the fabric and embed them in the rubber.

14. The method of making a rubberized cord fabric which consists in feeding two sets of cords onto opposite sides of a sheet of plastic rubber, progressively pressing the cords of one set into the spaces between the cords of the other set, thereby corrugating the rubber sheet and embedding the cords therein, and by the same pressing agency progressively applying a facing sheet of rubber to the fabric.

15. Fabric-making apparatus comprising means for laying a series of parallel cord strands in spaced relation, and means for laying a second series of cord strands in the spaces between the strands of the first-said series and forcing them against overlying plastic material.

16. Fabric-making apparatus comprising means for progressively laying a series of parallel cord strands in spaced relation, means for progressively overlying said strands with a sheet of rubber, and means for progressively forcing a second series of cord strands against said sheet and into the spaces between the strands of the first-said series.

17. Fabric-making apparatus comprising means for progressively feeding a sheet of plastic rubber between two sets of cords traveling at substantially the same rate as said sheet, means for positioning the cords of each set opposite the spaces between the cords of the other set, and means for pressing the cords of the two sets into substantially the same plane, thereby corrugating said rubber sheet and embedding the cords alternately therein from opposite sides.

18. Fabric-making apparatus comprising a pair of juxtaposed, positively-driven rolls formed with parallel, circumferential, cord-guiding grooves, the grooves of one roll registering with the intergroove ridges on the other roll; means for supplying cords to occupy said grooves, means for feeding a sheet of plastic rubber into the space between said rolls, and a pair of positively-driven, plain rolls located posterior to said grooved rolls with their peripheries close together for pressing the cords from one of the grooved rolls into the spaces between the cords from the other grooved roll, thereby corrugating the rubber sheet and embedding the cords alternately therein from opposite sides.

19. Fabric-making apparatus comprising means for progressively feeding together a sheet of plastic rubber and two sets of cords from opposite sides of said sheet, with the cords of each set registering with the spaces between the cords of the other set, a pair of positively-driven rolls for consolidating said cords and rubber sheet and propelling the fabric, and means for supplying a facing sheet of plastic rubber over one of the last-said rolls.

20. Fabric-making apparatus comprising a roll formed with a series of parallel cord-guiding grooves, a juxtaposed roll formed with a similar set of grooves alternating with the grooves of the first-said roll, two sets of cord spools and suitable guides for supplying cords in two sets to the grooves of the respective rolls, means for feeding a sheet of plastic rubber between the rolls and the two sets of cords thereon, and means for consolidating the cords and rubber sheet in one plane.

21. Fabric-making apparatus comprising means for feeding two sets of cords from opposite sides of an assembling zone, means for registering the cords of each set with the spaces between the cords of the other set, means for feeding a sheet of plastic rubber between the two sets of cords, means for consolidating said cords and sheet, and means coacting with said consolidating means for applying facing sheets of plastic rubber on opposite sides of the fabric.

22. In an apparatus of the character indicated, in combination, a pair of cooperating pressure rolls arranged to receive a sheet of material therebetween, means to feed a series of strands between one of said rolls and one side of said sheet and means cooperating with such roll to press a second series of strands into the other side of said sheet in staggered relation to the first named strands; substantially as described.

In testimony whereof I have hereunto set my hand this 13th day of January, 1919.

IRVIN E. FAIR.